United States Patent [19]

Sogawa

[11] Patent Number: 4,911,133

[45] Date of Patent: Mar. 27, 1990

[54] FUEL INJECTION CONTROL SYSTEM OF AUTOMOTIVE ENGINE

[75] Inventor: Yoshiyuki Sogawa, Tokyo, Japan

[73] Assignee: Fuji Jukogyo Kabushiki Kaisha, Tokyo, Japan

[21] Appl. No.: 324,673

[22] Filed: Mar. 17, 1989

[30] Foreign Application Priority Data

Mar. 25, 1988 [JP] Japan .................................. 63-71076

[51] Int. Cl.$^4$ ............................................. F02D 41/26
[52] U.S. Cl. ...................................... 123/494; 123/478
[58] Field of Search ............... 123/494, 478, 480, 488; 364/431.05, 510

[56] References Cited

U.S. PATENT DOCUMENTS

| | | | |
|---|---|---|---|
| 4,664,085 | 5/1987 | Kataoka | 123/480 |
| 4,741,313 | 5/1988 | Shimomura | 123/494 |
| 4,753,206 | 6/1988 | Inoue et al. | 123/478 |
| 4,773,375 | 9/1988 | Okino et al. | 123/494 |
| 4,785,784 | 11/1988 | Nanyoshi et al. | 123/478 |
| 4,792,905 | 12/1988 | Sekozawa et al. | 123/480 |
| 4,817,572 | 4/1989 | Nakaniwa et al. | 123/494 |
| 4,823,755 | 4/1989 | Hirose et al. | 123/494 |
| 4,846,132 | 7/1989 | Binnewics | 123/494 |

Primary Examiner—Raymond A. Nelli
Attorney, Agent, or Firm—Beveridge, DeGrandi & Weilacher

[57] ABSTRACT

A fuel injection control method and a system of an automotive engine uses a model of air within the intake pipe to estimate the quantity of air within the intake system downstream of the throttle valve on the basis of this air quantity and detected data from sensors such as an air flow meter and a crank angle sensor. The control unit determines the fuel injection quantity. The control system additionally determines the ignition timing. This control system controls the fuel injection quantity as well as the ignition timing in a manner to maintain optimum values thereof over a wide range of engine operational conditions including transient states.

4 Claims, 3 Drawing Sheets

FUEL INJECTION CONTROL SYSTEM OF AUTOMOTIVE ENGINE

BACKGROUND OF THE INVENTION

The present invention relates generally to a fuel injection system of engines of automotive vehicles and more particularly to a fuel injection control method and device capable of controlling the flow rate of fuel and air induced into an engine. Additionally, the present invention relates to the ignition timing control in a manner to maintain optimum values thereof over a wide range of engine operational conditions.

Fuel injection systems employing air flow meters have been used in various kinds of automotive engines. In a typical system of known type, the air flow meter is installed in the air intake system at an upstream position of the throttle valve to detect accurately the flow rate Q of the air induced into the engine. Then the basic fuel injection quantity $T_P$ corresponding to the fuel injection duration such as to provide a fuel quantity corresponding to the induced air flow rate Q. For example, the basic fuel injection quantity $T_P$ which is close to the theoretical (ideal) air-fuel ratio A/F is calculated in the formula of $T_P = Q/N$, where N is the engine speed. The fuel injector is basically controlled on the basis of $T_P$.

Conventionally, the $T_P$ is used as data for determining load in the ignition timing calculation. Therefore, a high degree of accuracy is required in the measurement of the engine induced air flow rate Q. Accordingly, precise means such as air flow meters of the hot-wire type possessing high response are used.

However, as described above, the air flow meter in such systems has conventionally been installed upstream of the throttle valve and therefore has not been positioned to directly measure the flow rate of the air induced into the engine. For this reason, in the case of a transient state of the engine operation such as the throttle valve is opened rapidly from a closed position to a wide opening, the quantity of the air flowing into the engine increases. At the same time, the pressure in the collector chamber or the intake manifold of the intake system installed downstream from the throttle valve also rises. Therefore, this excessive quantity of air mass induced by this pressure rise is also measured by the air flow meter.

That is, in the excessive quantity of air flowing into the engine is measured with the air flow meter on the upstream side of the throttle valve, when the throttle valve is opened widely. This excessive air quantity becomes a spike in the air intake system. The larger the capacity of the collector chamber or intake manifold is, the larger the spike is. Furthermore, this spike quantity increases with increase of sensitivity of the air flow meter.

Then, as the fuel injector is installed downstream from the intake manifold, excessive fuel is supplied into the engine according to the air quantity measured by the air flow meter. Consequently, an abrupt enrichment of the air-fuel ratio occurs, then the contents of harmful gases such as CO and HC in the exhaust gas increase. In the worst case, the engine power drops because of the over-rich mixture, and the drive feeling deteriorates.

Furthermore, if the controlling system also includes the ignition timing control, there is the possibility of an instantaneous retardation of the ignition timing caused by the functioning of a knocking prevention mechanism. As a consequence, an instant drop of the engine power and a deterioration of the emitted gases occur.

At transient state of the engine operation, deviations of the air-fuel ratio and the ignition timing from their optimum values also occur when the opening degree of the throttle valve varies from a widely opened position to the closed position.

Accordingly, there has previously been proposed an engine control system for controlling the fuel injection quantity and ignition timing which includes the following operational functions as disclosed in Japanese Patent Laid-Open Publication No. 261645/1987 by the same invention. With the use of a model of the air within the intake pipe, the pressure within the intake pipe is estimated according to the detected air flow rate measured by the air flow meter, the detected opening degree of the throttle valve, and the detected engine speed. Then, from this estimated pressure, the quantity of air filling the collector chamber and the intake manifold downstream of the throttle valve under a transient condition is estimated. From this estimated air quantity and the above mentioned air flow rate measured by the air flow meter, the actual induced air quantity is determined. Then, from this actual induced air quantity and the engine speed, the fuel injection rate and the ignition timing are determined.

However, as this control system requires a large number of measurement factors and moreover involves complicated computation formulae, the microcomputer memory capacitor becomes large.

SUMMARY OF THE INVENTION

Accordingly, it is an object of the present invention to provide a device for controlling the amount of fuel injection of an automotive engine capable of determining the fuel injection quantity and the ignition timing applicable for any conditions ranging from the normal state to a transient state. The system is provided with a relatively simple computation formula from the measured value by the air flow meter and the detected engine speed so as to maintain the optimum fuel injection for any operating condition.

According to the present invention there is provided a fuel injection control system of an automotive engine which may estimate the quantity of air within the intake system downstream of the throttle valve by using a model of the air within the intake pipe, and on the basis of this air quantity, can determine the exact fuel injection amount. The fuel injection control system comprises: first means for determining quantity of air which is induced through a throttle valve into an intake system downstream during one cycle of the engine from an air mass measured by an air flow meter for every operational cycle of the engine; calculating means for determining quantity of air induced into the engine during the preceding cycle from volume of the intake system downstream from the throttle valve and volumetric efficiency and displacement of engine cylinders; second means for determining total weight of induced air in the intake system by calculating from air quantity determined respectively by the first and calculating means and from the total weight of air within the intake system downstream from the throttle valve in the preceding cycle, third means for calculating present total weight of air within the intake system downstream from the throttle valve; and fourth means for setting basic fuel injection quantity in dependence on said total weight of air induced within the cylinders.

And in the fuel injection control system described above, there may be included an ignition timing determining means for determining the advance and retardation of the ignition timing in dependence on the total weight of induced air within the cylinders.

According to the present invention, the total weight of the air downstream from the throttle valve is estimated for each cycle. Accordingly, weight of air in the intake system downstream from the throttle valve and weight of air induced into the cylinders are accurately determined even at the transient condition. Therefore, the deviation from the set value of the air-fuel ratio at the time of a transient condition can be minimized. As a result, the ingredients of CO and HC in the exhaust gas are reduced, and the drive feeling is also improved.

With respect to the ignition timing, unnecessary retardation at the time of acceleration can be prevented. Then the drive feeling and reduction of emission can be improved. The larger the displacement of the intake manifold downstream the throttle valve is, the more the effect of improvement mentioned above is.

In addition, quantitative factors such as the degree of opening of the throttle valve are not taken into consideration for calculation in the instant control system. Therefore, the computation formula is simplified, and advantages such as a saving in the memory capacity of the microcomputer are afforded.

The further features of the present invention will become understood from the following detailed description referring to the accompanying drawings.

DETAILED DESCRIPTION OF THE PREFERRED EMBODIMENTS

Figure 1:
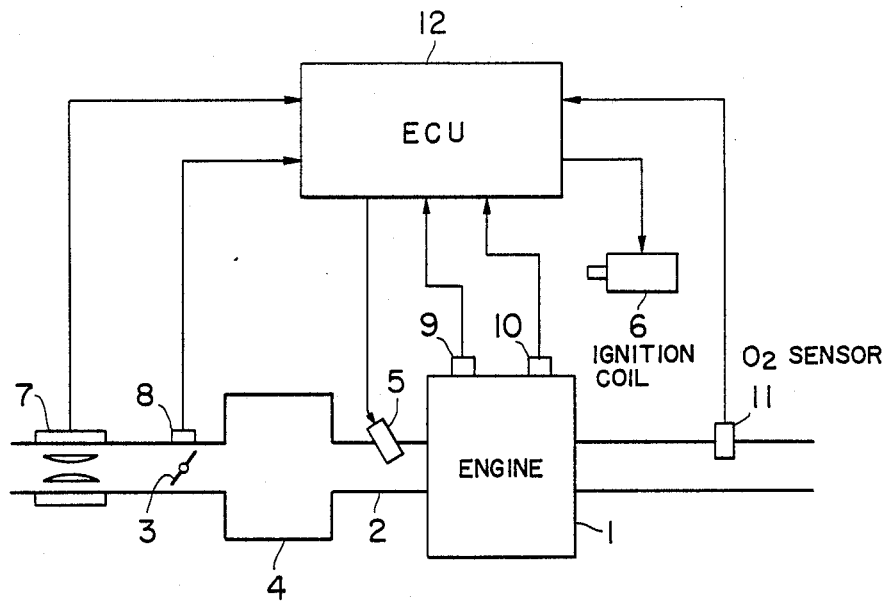
FIG. 1 is a combination of a block diagram and an engine intake-exhaust flow diagram of a control system according to the present invention.

FIG. 1 schematically shows the control system of the present invention. An engine 1 induces air through an intake pipe 2 provided therein with a throttle valve 3 and a collector chamber 4 disposed downstream from the throttle valve 3. A fuel injector 5 is mounted between the collector chamber 4 and the engine 1 to inject fuel into the intake pipe 2. An air flow meter 7 of hot-wire type is installed in the intake pipe 2 upstream of the throttle valve 3 and provides output signals corresponding to induced air quantity Q. A throttle sensor 8 detects the opening degree of the throttle valve 3. Coolant temperature in the engine 1 is detected by a sensor 9, and a crank angle of the engine crank shaft is detected by a crank angle sensor 10. An $O_2$ sensor 11 is installed in an exhaust pipe.

The output signals respectively from the meter 7 and the sensors 8, 9, 10, and 11 are fed into a control unit 12 comprising microcomputers. On the basis of this data, the control unit 12 generates control output signals, which are transmitted respectively to the fuel injector 5 and an ignition coil 6 of the engine 1.

Figure 2:
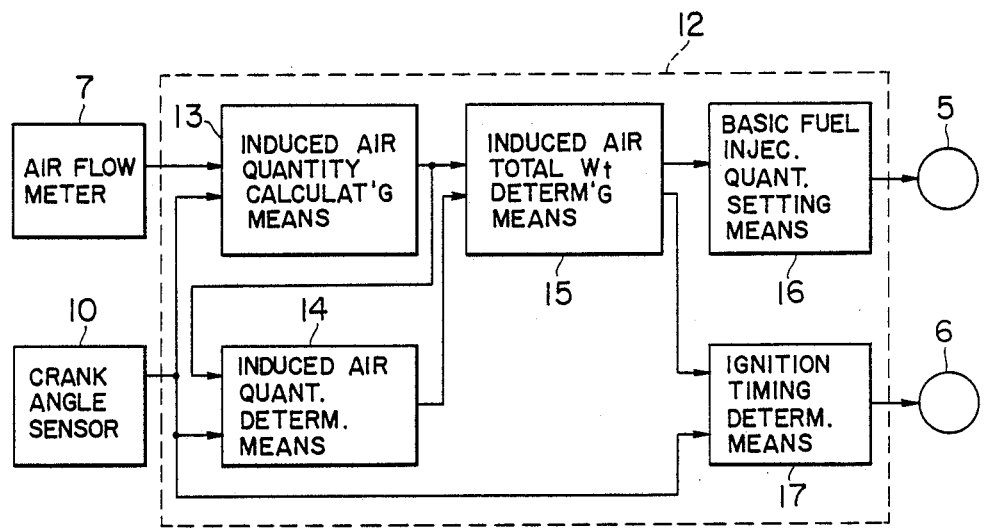
FIG. 2 is a block diagram of the fuel injection control system of the present invention.

Referring to FIG. 2, the control unit 12 comprises the following determining and setting means.

On the input side, there is connected an induced air quantity calculating means 13 to the air flow meter 7. The induced air quantity calculating means 13 calculates quantity of air which is induced in one cycle downstream the throttle valve 3 from the output signal (induced air flow rate Q) detected the air flow meter 7 and on the basis of an air model. At the same time, the induced air quantity calculating means 13 multiplies this quantity of air by density of the air to determine air weight. An induced air quantity determining means 14 calculates the weight of air induced into the engine 1 during the cycle mentioned above from a volume Vo of an air intake system downstream from the throttle valve 3, an engine volumetric efficiency $\eta$, and a displacement Vh. The induced air quantity calculating and determining means 13 and 14 are connected to an induced air total weight determining means 15. The induced air total weight determining means 15 calculates air total weight $G(t_n)$ within the same air intake system of the present cycle from the air weight thus obtained respectively from these means 13 and 14 and from the air total weight $G(t_{n-1})$ within the air intake system downstream from the throttle valve which was determined in the preceding cycle. In addition, a basic fuel injection quantity setting means 16 is connected to the induced air total weight determining means for setting a basic fuel injection quantity $T_P$ by the weight of air filling the cylinders from the air total weight $G(t_n)$.

More specifically, in the induced air quantity calculating means 13 for determining the quantity of induced air in the intake system, the quantity of air is calculated by the following formula:

$$\int_{t_{n-1}}^{t_n} Q\, dt$$

The amount of air flowed through the throttle valve 3 during one cycle is calculated with the engine speed N transmitted from the crank angle sensor 10 and the induced air flow rate Q as parameters. Furthermore, with a coefficient $K_1$ including air density, the air weight a induced in during one cycle is represented by $a = K_1 \cdot Q/N$.

In the induced air quantity determining means 14, the induced air weight $b_{n-1} = (Vh\eta/Vo) \cdot G(t_{n-1})$ of the preceding cycle is calculated with the previously determined air intake system volume Vo downstream from the throttle valve 3, the engine volumetric efficiency $\eta$, and the displacement Vh as calculation factors. This $G(t_{n-1})$ is the induced air total weight of the preceding cycle. The volumetric efficiency $\eta$ is stored as a map in a ROM in a function of the induced air total weight G and the engine speed N. Then, upon receiving the output signal N of the crank angle sensor 10, the computation begins.

In the induced air total weight determining means 15 for determining the induced air total weight, the induced air weight a is added to the induced air total weight $G(t_{n-1})$ of the preceding cycle. However, at starting the engine $G(t_o)$ of the initial value of $G(t_n)$ is calculated on the assumption that the pressure of the system downstream from the throttle valve 3 is regarded as standard atmospheric pressure. Further, by subtracting the induced air weight $b_{n-1}$ of the preceding cycle from the above obtained sum to obtain the value $G(t_n) = G(t_{n-1}) + a - b_{n-1}$, computation for estimating the present total air weight $G(t_n)$ within the intake system downstream of the throttle valve 3 is carried out.

In the basic fuel injection quantity setting means 16, the weight of the air filling the cylinders, $b_n=(Vh\eta/Vo)\cdot G(t_n)$, in the present cycle is determined from the estimated value $G(t_n)$. Also, the basic fuel injection quantity $T_P$ is determined as $T_P=K_2\cdot(Vh\eta/Vo)\cdot G(t_n)$. In the formula, $K_2$ is a coefficient.

In the ignition timing determining means 17, the optimum ignition timing is determined by reference or similar method by using a map from the total weight $G(t_n)$ of the induced air in the intake system and the engine speed N. The output signal obtained from the ignition timing determining means 17 is transmitted to the ignition coil 6 to ignite at an optimum timing.

Figure 3:
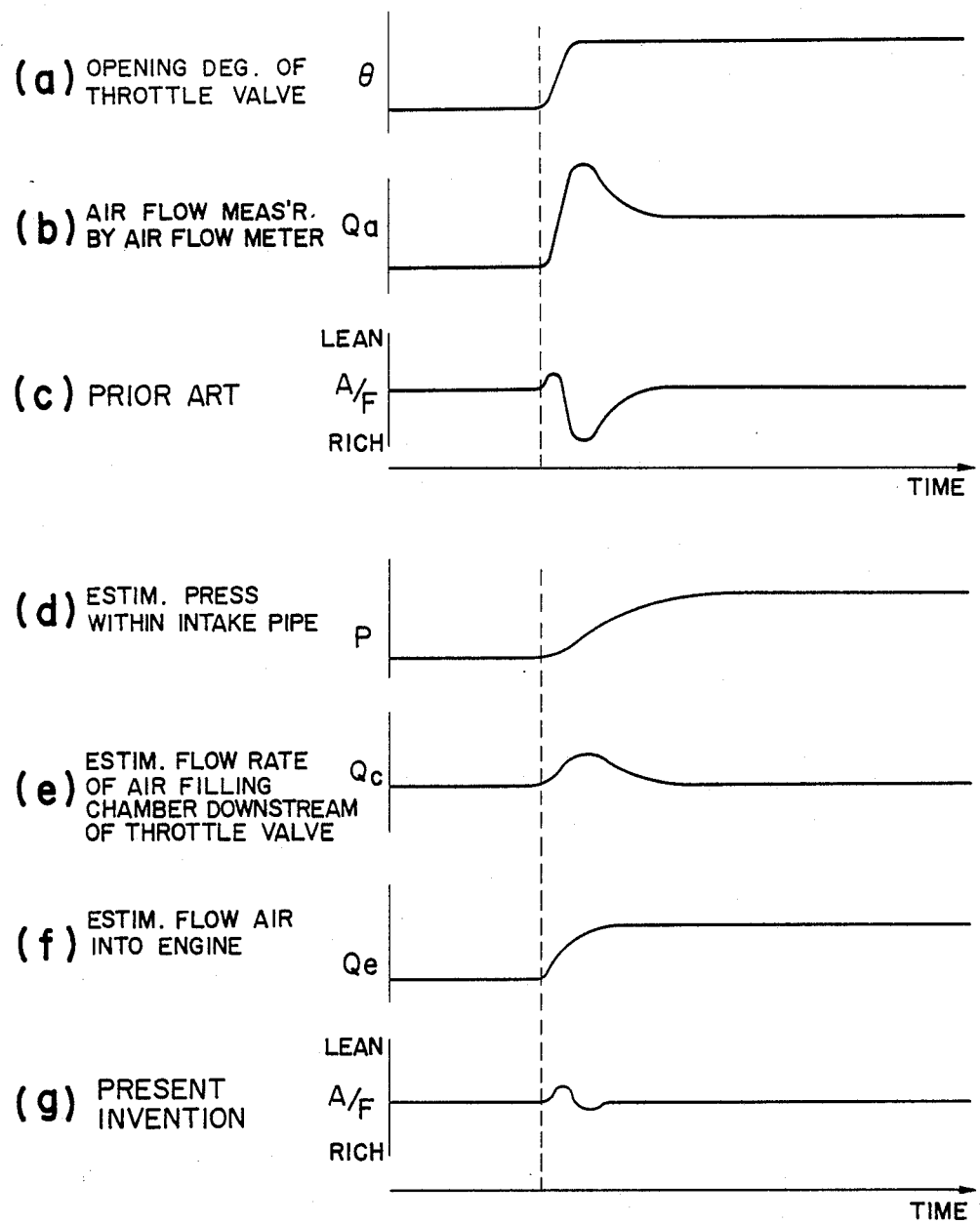
FIGS. 3(a) to 3(g) are graphs respectively indicating the variations of various quantitative data at the time of a transient states.

Under a transient condition that the throttle valve 3 is abruptly opened, the air flow rate Qa measured by the air flow meter 7 increases the actual induced air quantity Qe into the engine as indicated in FIG. 3(b). Simultaneously, quantity of air for filling the cylinders causes to increase pressure P within the intake system downstream from the throttle valve 3. As a result, overshooting occurs. Consequently, if the fuel injection quantity is calculated with the measured value Qa as the actual induced air quantity as in the prior art, a great fluctuation of the air-fuel ratio A/F occurs temporarily as indicated in FIG. 3(c).

However, according to the present invention, computation is carried out from the induced air quantity Q with the use of the model formula as described hereinabove. Then, as indicated in FIG. 3(e), the estimated air flow rate Qc (excluded the induced air weight) of the intake system downstream from the throttle valve 3 is determined. Thus, for every cycle of the engine operation, the total air weight $G(t_n)$ within the intake system downstream from the throttle valve 3 is calculated. Therefore, as indicated in FIG. 3(g), the fluctuation of the air-fuel ratio A/F is very small. Thus, even at a time of transient state, optimum control of the fuel injection can be realized.

Figure 4:
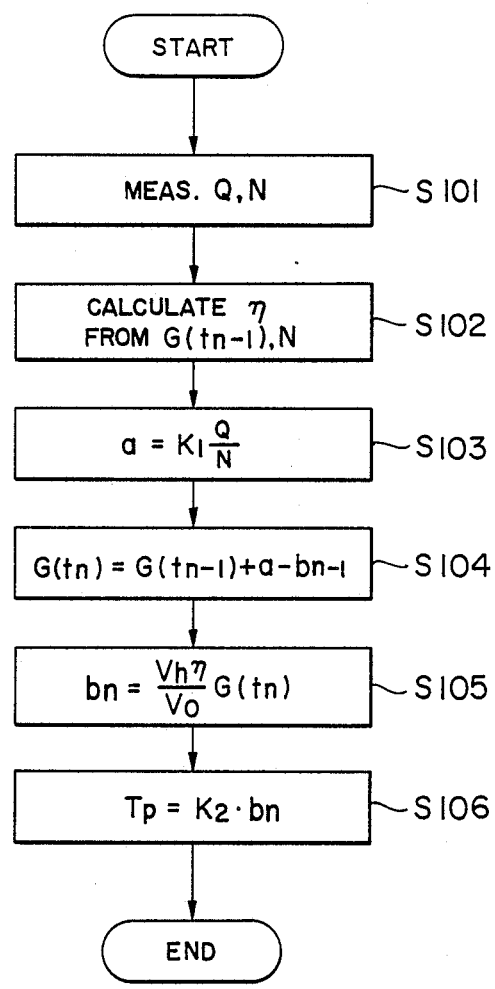
FIG. 4 is a flow chart of operational steps of the fuel injection control system of the present invention.

The sequence of computation in one cycle of fuel injection control operation in the control unit 12 is indicated in FIG. 4. First, as described hereinbefore, the output value Q of the air flow meter 7 and the engine speed N are measured at step S101. In the succeeding step S102, the volumetrical efficiency $\eta$ of the cylinders is calculated according to the map from the total weight $G(t_{n-1})$ of the induced air of the intake system downstream from the throttle valve 3 of the preceding cycle and the engine speed N. At step S103, $a=K_1Q/N$ is calculated. At step S104, $G(t_n)=G(t_{n-1})+a-b_{n-1}$ (wherein $b_{n-1}$ is the total air weight induced in the cylinders in the preceding cycle) is calculated. At step S105, the weight $b_n=(Vh\eta/Vo)\cdot G(t_n)$ of the air filling the cylinders in the preceding cycle is determined. Finally, at step S106, the basic fuel injection quantity $T_P=K_2\cdot b_n$ is calculated.

As described above, the present invention provides a fuel injection control system of an automotive vehicle which is capable of determining the fuel injection quantity and further the ignition timing in a wide operational range from normal state to a transient state from the measurement value of the air flow meter and the engine speed by a relatively simple computation mode. As a result, an optimum fuel injection quantity is maintained for all conditions.

What is claimed is:

1. A fuel injection control method of an automotive engine which estimates quantity of air within an intake system downstream of a throttle valve by using a model of air within an intake pipe and determines fuel injection amount on the basis of the air quantity, said fuel injection control method comprising the steps of:
   calculating the quantity of air which is induced through the throttle valve into the intake system during one cycle from the air flow measured by an air flow meter for every operational cycle of the engine;
   determining the quantity of air induced into the engine during a preceding cycle from volume of the intake system downstream from the throttle valve, a volumetric efficiency of cylinders and a displacement;
   deciding total weight of induced air in the intake system from the quantities of air induced into the intake system and into the engine;
   estimating total weight of induced air within the cylinders on the basis of the value of said total weight of induced air in the intake system; and
   setting the basic fuel injection quantity on the basis of said total weight of induced air within the cylinder.

2. The fuel injection control method according to claim 1, wherein said method further comprises the step of:
   determining magnitude of advance and retardation of ignition timing in dependence on the total weight of induced air within the cylinders.

3. A fuel injection control system of an automotive engine which estimates quantity of air within an intake system downstream of a throttle valve by using a model of air within an intake pipe and determines the fuel injection quantity in dependence on the air quantity, said fuel injection control device comprising:
   induced air quantity calculating means for determining the quantity of air which is induced through the throttle valve into the intake system during one cycle from the air flow measured by an air flow meter for every operational cycle of the engine;
   induced air quantity determining means for determining the quantity of air induced into the engine during a preceding cycle from volume of the intake system downstream from the throttle valve, a volumetric efficiency of the cylinders and a displacement;
   induced air total weight determining means for estimating present total weight of air within the intake system downstream from the throttle valve from the air quantities determined respectively by the induced air quantity calculating and determining means and total weight of air within the intake system downstream from the throttle valve which is induced in the preceding cycle; and
   basic fuel injection quantity setting means for setting basic fuel injection quantity in dependence on said total weight of air induced within the cylinders.

4. The fuel injection control system according to claim 3, wherein said system further comprises ignition timing determining means for determining a magnitude of the advance and retardation of the ignition timing in dependence on said total weight of induced air within the cylinders.

* * * * *